(No Model.) 2 Sheets—Sheet 1.
W. R. MANN & G. KEITH.
HAY RAKE.

No. 406,363. Patented July 2, 1889.

Witnesses
John Enders Jr
E. C. Duffy

Inventors
William R Mann
George Keith
By their Attorneys (No Model.) 2 Sheets—Sheet 2.

W. R. MANN & G. KEITH.
HAY RAKE.

No. 406,363. Patented July 2, 1889.

UNITED STATES PATENT OFFICE.

WILLIAM R. MANN AND GEORGE KEITH, OF EARLVILLE, ILLINOIS.

HAY-RAKE.

SPECIFICATION forming part of Letters Patent No. 406,363, dated July 2, 1889.

Application filed January 14, 1889. Serial No. 296,291. (No model.)

*To all whom it may concern:*

Be it known that we, WILLIAM R. MANN and GEORGE KEITH, citizens of the United States of America, residing at Earlville, in the county of La Salle and State of Illinois, have invented certain new and useful Improvements in Hay-Rakes, of which the following is a specification, reference being had therein to the accompanying drawings.

This invention pertains to certain improvements in horse hay-rakes, having for its object to promote convenience in the operation of the machine; and to these ends the invention consists of the combination of parts, including their construction, substantially as hereinafter fully set forth, and pointed out in the claim.

Figure 1:
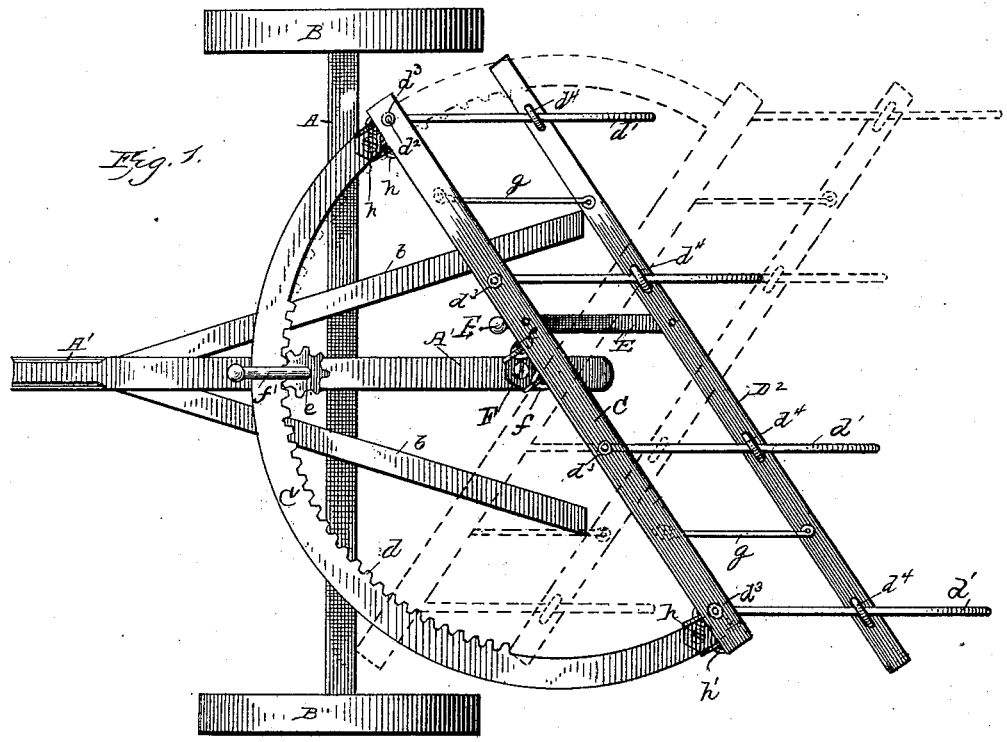
Figure 2:
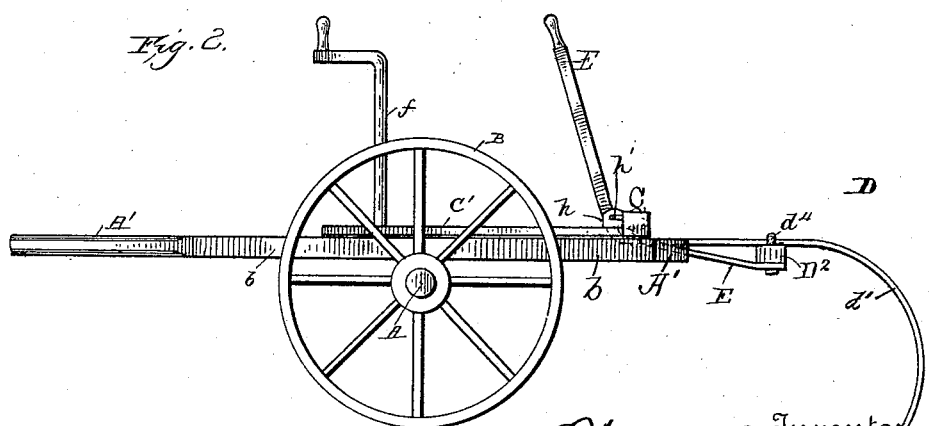
Figure 3:
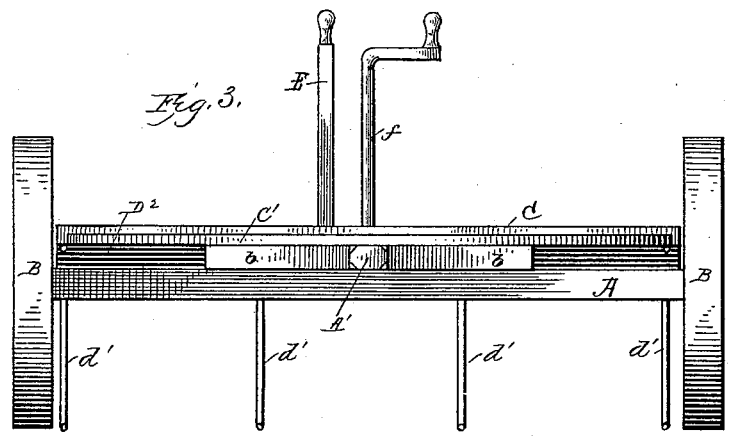

In the accompanying drawings, Figure 1 is a plan view of our improved horse hay-rake, disclosing more particularly its two angular positions, one being represented in full lines and the other in dotted lines. Fig. 2 is a side elevation of the same, and Fig. 3 is a front elevation thereof.

In the embodiment of our invention we employ axle A, bearing wheels B B, and to which is secured a tongue A' or shafts, according as to whether the rake is to be drawn by a single or a double team. The tongue or pole A' is suitably braced to the axle by oblique or diagonal pieces $b$ $b$. On the tongue at its rear end is pivoted the rake-head C. The teeth $d'$ of the rake are formed at their inner ends with upwardly-projecting or vertical portions $d^2$ $d^2$, which are held so as to turn freely in cylindric bearings or tubes $d^3$ $d^3$ let into the rake-head C, thus pivoting said teeth in position. The teeth are semicircularly curved at their outer or rear portions downwardly and are confined in staples or eyes $d^4$ applied to a second cross-piece or tooth-bar $D^2$, which is connected to and held parallel with the rake-head C by means of rods $g$ $g$, pivoted at their ends to said parts C $D^2$. This arrangement effects the holding of the teeth always at right angles to the axle and in planes parallel with the tongue or in the line of the draft. The rake-head C is pivotally connected to the semicircular bar or rack C', the connection being effected by ear-plates $h$, secured to the upper side of said bar or rack near its ends, and staples $h'$, secured or driven into said rake-head and engaging said ear-plates. The pivotal connection between the rake-head and the tongue or pole A' is effected by means of a proximately bail-shaped plate F, centrally pivoted to the tongue A' at its rear end, and connected to the rake-head by staples $f$ $f$, passing through ears or eyes of said bail or plate and driven into the rake-head. This contrivance permits, with the pivotal character of the teeth, the movement or swiveling of the rake-head, so as to deflect or incline the latter, as also the rake-teeth, either to the right or left. The inner concave side of the semicircular bar C' is provided with a series of teeth $d$, which engage a pinion $e$ on a handled shaft $f'$, journaled at its lower end in tongue A', and by turning which handled shaft $f'$ the rack, with the rake-head, is shifted to stand at an inclination to the line of travel. This permits of the rake delivering its contents or load to either side of the line of travel as the operator may desire.

E is a hand-lever pivoted or connected to both the rake-head C and the tooth-bar $D^2$, and extending upwardly within convenient reach of the driver or operator occupying a seat suitably secured upon the machine. By exerting forward and downward pressure upon this lever at its upper free end the rake-teeth are elevated and relieved of their contents or load.

It will be seen from the foregoing, first, that the rake-head being centrally pivoted it can be adjusted at such an angle as shall enable it to do the most perfect work as a side-delivery rake; second, that the pivoting of the teeth at the head gives them perfect freedom to follow the line of draft at whatever angle the head may be set in, as also avoiding the liability of breaking the teeth in turning the machine; third, that the teeth following the line of draft are always at right angles to the axle and parallel to the tongue, except when the rake is turning at the corners, and as the hand or dump lever is connected to both the head and tooth bar it is always in line with the teeth, and will effect the dumping operation with equal facility whatever may be the position of the head of the rake; fourth, that the teeth proper being an exact semicircle, as they are designed to be, the hay is caused to roll in the rake, which is necessary to the successful working of a side-delivery rake.

Having thus fully described our invention, what we claim, and desire to secure by Letters Patent, is—

The horse hay-rake comprising the semicircular rack, the rake-head to which said rack is pivoted at its ends, the tongue or draft-pole extension upon which at its rear end said rake-head is pivoted by means of a pivoted ear-plate and staples, the tooth-bar having pivoted connection with said rake-head, the rake-teeth having pivotal connection with the rake-head, and the handled shaft carrying a pinion engaging said rack, substantially as set forth.

In testimony whereof we affix our signatures in presence of two witnesses.

WILLIAM R. MANN.
GEORGE KEITH.

Witnesses:
H. A. CHASE,
S. M. WARREN.